US010348196B2

(12) United States Patent
Sasaki

(10) Patent No.: US 10,348,196 B2
(45) Date of Patent: Jul. 9, 2019

(54) SWITCHING CONVERTER

(71) Applicant: ROHM CO., LTD., Ukyo-Ku Kyoto (JP)

(72) Inventor: Yoshikazu Sasaki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/835,945

(22) Filed: Dec. 8, 2017

(65) Prior Publication Data

US 2018/0102707 A1   Apr. 12, 2018

Related U.S. Application Data

(63) Continuation of application No. PCT/JP2016/066269, filed on Jun. 1, 2016.

(30) Foreign Application Priority Data

Jun. 8, 2015   (JP) .................................. 2015-115775

(51) Int. Cl.
*H05B 33/08* (2006.01)
*H02M 3/155* (2006.01)
(Continued)

(52) U.S. Cl.
CPC ........... *H02M 3/155* (2013.01); *H02M 3/156* (2013.01); *H05B 33/0815* (2013.01); *H02M 2001/0025* (2013.01)

(58) Field of Classification Search
CPC .. H02M 3/155; H02M 3/156; H05B 33/0815; H05B 33/0818
(Continued)

(56) References Cited

U.S. PATENT DOCUMENTS

2008/0224636 A1*  9/2008  Melanson .......... H05B 33/0815
                                                          315/307
2011/0069094 A1*  3/2011  Knapp ................. G09G 3/2003
                                                          345/690
(Continued)

FOREIGN PATENT DOCUMENTS

JP   2003153529 A   5/2003
JP   2004047538 A   2/2004
(Continued)

OTHER PUBLICATIONS

International Preliminary Report on Patentability corresponding to Application No. PCT/JP2016/066269; dated Dec. 12, 2017.
(Continued)

*Primary Examiner* — Douglas W Owens
*Assistant Examiner* — Syed M Kaiser
(74) *Attorney, Agent, or Firm* — Cantor Colburn LLP

(57) ABSTRACT

A CS terminal receives a detection voltage $V_{CS}$ corresponding to voltage drop across a detection resistor $R_{CS}$ provided on a path of a drive current $I_{LED}$ or an inductor current $I_L$. An ADIM terminal receives an analog dimming voltage $V_{ADIM}$ indicating a target amount of the drive current $I_{LED}$. A coefficient circuit multiplies at least one of the detection voltage $V_{CS}$ and the analog dimming voltage $V_{ADIM}$ by a variable coefficient and generates a current detection signal $I_S$ and a current setting signal $I_{REF}$. A pulse modulator generates a drive pulse $S_{DRV}$ whose duty ratio is adjusted such that the current detection signal $I_S$ approaches the current setting signal $I_{REF}$. A driver drives a switching transistor M according to the drive pulse $S_{DRV}$.

22 Claims, 11 Drawing Sheets

(51) Int. Cl.
*H02M 3/156* (2006.01)
*H02M 1/00* (2006.01)

(58) Field of Classification Search
USPC .............................. 315/291, 294, 307, 224
See application file for complete search history.

(56) References Cited

U.S. PATENT DOCUMENTS

| | | | | |
|---|---|---|---|---|
| 2011/0309760 | A1* | 12/2011 | Beland | H02M 1/4258 315/201 |
| 2013/0163243 | A1* | 6/2013 | Reed | H05B 33/0803 362/235 |
| 2013/0187561 | A1* | 7/2013 | Franck | H05B 33/0815 315/201 |
| 2013/0207571 | A1* | 8/2013 | Esaki | H05B 37/02 315/297 |
| 2014/0125246 | A1* | 5/2014 | Sasaki | H05B 33/0845 315/224 |
| 2014/0168567 | A1* | 6/2014 | Kikuchi | H05B 33/0815 349/61 |
| 2014/0218657 | A1* | 8/2014 | Haruta | G09G 3/342 349/61 |
| 2015/0091465 | A1* | 4/2015 | Kato | H02M 3/33507 315/205 |
| 2015/0245438 | A1* | 8/2015 | Tyrrell | H05B 33/0845 315/186 |
| 2017/0238380 | A1* | 8/2017 | Bannister | H05B 33/0812 315/224 |

FOREIGN PATENT DOCUMENTS

| | | |
|---|---|---|
| JP | 2014154328 A | 8/2014 |
| JP | 2015070698 A | 4/2015 |
| JP | 2015076922 A | 4/2015 |

OTHER PUBLICATIONS

International Search Report corresponding to Application No. PCT/JP2016/066269; dated Aug. 23, 2016.

Notification of Reasons for Refusal corresponding to Japanese Patent Application No. 2015-115775; dated Feb. 5, 2019.

* cited by examiner

500a

500b

600

SWITCHING CONVERTER

CROSS REFERENCE TO RELATED APPLICATIONS

This application is a bypass continuation under 35 U.S.C. § 120 of PCT/JP2016/066269, filed on Jun. 1, 2016, which is incorporated herein reference and which claimed priority to Japanese Patent Application No. 2015-115775 filed on Jun. 8, 2015, the entire contents of which is also incorporated herein by reference.

BACKGROUND OF THE INVENTION

1. Field of the Invention

The present invention relates to a switching converter.

2. Description of the Related Art

As liquid crystal backlights and lighting fixtures, semiconductor light sources such as LEDs (light emitting diodes) are widely used. FIG. 1 is a circuit diagram of a step-up (boost) switching converter. A switching converter 100R receives an input voltage $V_{IN}$ from a power source (not illustrated) to an input line 104 and boosts the input voltage to supply an output voltage $V_{OUT}$ to an LED light source 502 which is a load connected to an output line 106, and also an electric current (referred to as a load current or a drive current) $I_{LED}$ flowing into the LED light source 502 is stabilized to a target value $I_{REF}$. For example, the LED light source 502 is a light emitting diode (LED) string, and the switching converter 100R sets the target current value $I_{REF}$ of the load current $I_{LED}$ according to target brightness of the LED string.

The switching converter 100R includes an output circuit 102 and a control circuit 300R. The output circuit 102 includes a smoothing capacitor C1, a rectifier diode D1, a switching transistor M1, an inductor L1, a detection resistor $R_{CS}$, and a dimming transistor M2. The arrangement of the inductor L1, the switching transistor M1, the rectifier diode D1, and the smoothing capacitor C1 is a topology of a general boost converter.

The current $I_{LED}$ flowing through the LED light source 502 flows through a detection resistor $R_{CS}$ and generates a voltage drop proportional to the current $I_{LED}$ across the detection resistor $R_{CS}$. The voltage drop is input to a current detection (CS) terminal of the control circuit 300R as a detection voltage $V_{CS}$. An analog dimming voltage $V_{ADIM}$ indicating the target value $I_{REF}$ of the load current $I_{LED}$ is input to an analog dimming (ADIM) terminal of the control circuit 300R from an external host processor. The control circuit 300R generates a drive pulse $S_{DRV}$ whose duty ratio is adjusted such that the detection voltage $V_{CS}$ matches the analog dimming voltage $V_{ADIM}$ and drives the switching transistor M1.

The control circuit 300R studied by the present inventors includes an amplifier 302, an error amplifier 304, a duty controller 306, a driver 308, and a PWM dimming controller 310. It should be noted that the configuration of the control circuit 300R is not to be recognized as a known technique.

The amplifier 302 amplifies (including attenuation) the analog dimming voltage $V_{ADIM}$ with a predetermined gain g. The error amplifier 304 amplifies an error between the detection voltage $V_{CS}$ and an output voltage $g \times V_{ADIM}$ of the amplifier 302 and generates a feedback signal $V_{FB}$ according to the error. For example, the error amplifier 304 includes a transconductance amplifier (gm amplifier) and a phase compensation resistor $R_{FB}$ and a capacitor $C_{FB}$ connected to the output thereof.

The duty controller 306 is a pulse modulator and generates a drive pulse $S_{DRV}$ having a duty ratio corresponding to the feedback signal $V_{FB}$. The driver 308 switches the switching transistor M1 according to the drive pulse $S_{DRV}$.

The PWM dimming controller 310 is provided for PWM dimming. In the PWM dimming, an effective light amount is changed by changing a light emission time of the LED light source 502. The PWM dimming controller 310 switches the dimming transistor M2 according to a dimming pulse $S_{PWMOUT}$ having a duty ratio corresponding to a target light amount of the LED light source 502.

In this switching converter 100R, feedback is applied such that the following relational expression holds.

$$I_{LED} \times R_{CS} = g \times V_{ADIM}$$

Therefore, the load current $I_{LED}$ is stabilized to the target current amount $I_{REF}$ proportional to the analog dimming voltage $V_{ADIM}$.

$$I_{LED} = I_{REF} = g \times V_{ADIM}/R_{CS}$$

FIG. 2 is a diagram indicating the relationship between the analog dimming voltage $V_{ADIM}$ and the drive current $I_{LED}$. An actual drive current $I_{LED}'$ deviates from the target current $I_{REF}$ due to various errors and can be expressed by the following equation.

$$I_{LED}' = I_{OFS} + \alpha(g \times V_{DIM}/R_{CS})$$

$I_{OFS}$ indicates an offset error, and α indicates the influence of a gain error.

For example, the offset error $I_{OFS}$ is influenced by an input offset voltage of the error amplifier 304, and the gain error α can be influenced by a gain of the amplifier 302 and a variation of the detection resistor $R_{CS}$. In FIG. 2, the drive current $I_{LED}'$ influenced by the offset error is indicated by a broken line. The influence of the offset current $I_{OFS}$ is small in a region where the drive current $I_{LED}$ is large. However, the influence is significant in a region where the drive current $I_{LED}$ is small.

When the analog dimming voltage $V_{ADIM}$ is zero, there is also a dimming characteristic such that the drive current $I_{LED}$ becomes non-zero (minimum current $I_{MIN}$).

$$I_{LED} = I_{REF} = I_{MIN} + g \times V_{ADIM}/R_{CS}$$

Alternatively, as the analog dimming voltage $V_{ADIM}$ increases, there is also a dimming characteristic that decreases the drive current $I_{LED}$.

$$I_{LED} = I_{REF} = I_{MAX} - g \times V_{ADIM}/R_{CS}$$

As described above, the influence of the offset error in the region where the drive current $I_{LED}$ is small increases in various dimming characteristics. Particularly in applications where a dynamic range of the drive current $I_{LED}$ is wide, the influence of the offset current $I_{OFS}$ will be a problem.

SUMMARY OF THE INVENTION

This problem should not be regarded as a range of common general knowledge in the field of the present invention, more specifically, this problem is independently recognized by the present inventor.

The present invention has been made in view of the above problems, and one of exemplary purposes of an embodiment is to provide a switching converter in which the influence of an offset error is reduced and a control circuit therefor.

An embodiment of the present invention relates to a control circuit of a switching converter which supplies a drive current to a light source. A control circuit includes a current detection terminal, an analog dimming terminal, a coefficient circuit, a pulse modulator, and a driver. The current detection terminal receives a detection voltage corresponding to a voltage drop across a detection resistor provided on a path of a drive current or an inductor current. The analog dimming terminal receives an analog dimming voltage indicating a target amount of the drive current. The coefficient circuit multiplies at least one of the detection voltage and the analog dimming voltage by a variable coefficient and generates a current detection signal and a current setting signal. The pulse modulator generates a drive pulse whose duty ratio is adjusted such that the current detection signal approaches the current setting signal. The driver drives a switching element of the switching converter according to the drive pulse.

According to the embodiment, by switching a coefficient of the coefficient circuit in accordance with a current range of the drive current, the range of the current detection signal and the current setting signal can be maintained in a high state in a range where the drive current is small. As a result, the influence of an offset error can be reduced.

In one embodiment, the coefficient circuit may include a first coefficient circuit which multiplies a detection voltage by a first coefficient selectable from a plurality of values and generates a current detection signal.

In one embodiment, the first coefficient is switchable at least between a first value used in a first current range of the drive current and a second value used in a second current range of the drive current, and a variable range of the analog dimming voltage in the first current range overlaps with a variable range of the analog dimming voltage in the second current range.

As a result, the range of the analog dimming voltage to be generated by an external circuit can be narrowed.

In one embodiment, the first coefficient circuit may include a voltage dividing circuit having a variable dividing ratio. The first coefficient circuit may include a variable gain amplifier in which a gain is variable.

In one embodiment, the coefficient circuit may further include a second coefficient circuit which multiplies an analog dimming voltage by a second coefficient and generates a current setting signal.

In one embodiment, the coefficient circuit may include a second coefficient circuit which multiplies an analog dimming voltage by a second coefficient selectable from a plurality of values and generates a current setting signal.

In one embodiment, a second coefficient is switchable at least between the first value used in the first current range of the drive current and the second value used in the second current range of the drive current, and the variable range of the analog dimming voltage in the first current range overlaps with the variable range of the analog dimming voltage in the second current range. As a result, the range of the analog dimming voltage to be generated by an external circuit can be narrowed.

In one embodiment, the second coefficient circuit may include a voltage dividing circuit having a variable dividing ratio. The second coefficient circuit may include a variable gain amplifier in which a gain is variable.

In one embodiment, a switching converter may be a step-down switching converter including an output capacitor provided between an input line and an output line, an inductor, a switching transistor, and a detection resistor provided in series between the output line and a ground line, and a diode in which a cathode is connected to the input line, and an anode is connected to a connection point between the inductor and the switching transistor.

In one embodiment, the pulse modulator may include a current limit comparator, a zero current detection circuit, and a logic circuit. The current limit comparator compares a current detection signal with a current setting signal and asserts a reset pulse when the current detection signal exceeds the current setting signal. The zero current detection circuit asserts a set pulse when a current flowing into an inductor is substantially zero. The logic circuit receives the set pulse and the reset pulse and generates the drive pulse. (i) The drive pulse transits to an ON level corresponding to turning-on of the switching transistor when the set pulse is asserted, and (ii) the drive pulse transits to an OFF level corresponding to turning-off of the switching transistor when the reset pulse is asserted.

In one embodiment, the pulse modulator may further include a leading edge blanking circuit which masks the assertion of the reset pulse during a mask period that is a period from the turning-on of the switching transistor to the lapse of a predetermined time and outputs a reset pulse after masking to the logic circuit.

In one embodiment, the switching converter may further include a first capacitor and a first resistor provided in series between the connection point of the inductor and the switching transistor and the ground line. The zero current detection circuit may assert a set pulse when a potential of the first resistor crosses a predetermined threshold voltage.

In one embodiment, the switching converter may further include an auxiliary winding coupled with the inductor. The zero current detection circuit may assert a set pulse when a voltage of the auxiliary winding crosses a predetermined threshold voltage.

In one embodiment, the switching converter may be a step-up switching converter including an inductor and a switching transistor, a rectifying element, and an output capacitor. The inductor and the switching transistor are provided in series between an input line and a ground line. In the rectifying element, one end is connected to an output line, and the other end is connected to a connection point of the inductor and the switching transistor. The output capacitor is connected to the output line.

In one embodiment, the pulse modulator may include an error amplifier and a duty controller. The error amplifier amplifies an error between the current detection signal and the current setting signal. The duty controller generates the drive pulse having a duty ratio corresponding to an output of the error amplifier.

In one embodiment, the control circuit may further include a pulse dimming terminal which receives a dimming pulse for pulse modulation dimming from a host processor which generates an analog dimming voltage. A coefficient circuit may be controlled based on the amplitude of the dimming pulse. As a result, an appropriate coefficient can be selected without providing an additional control signal line.

In one embodiment, the control circuitry may be monolithically integrated on a single semiconductor substrate. "being monolithically integrated" includes the case where all of components of a circuit are formed on a semiconductor substrate and the case where main components of a circuit are integrated, and a part of a resistor and a capacitor may be provided outside the semiconductor substrate for adjusting a circuit constant.

Another embodiment of the present invention relates to a switching converter. The switching converter includes any of the above-described control circuits.

Another embodiment of the present invention relates to a lighting apparatus. The lighting apparatus may include an LED light source, a rectifier circuit, and a switching converter. The LED light source includes a plurality of LEDS (light emitting diodes) connected in series. The rectifier circuit smooths and rectifies a commercial AC (Alternating current) voltage. The switching converter receives a DC (direct current) voltage smoothed and rectified by the rectifier circuit as an input voltage, and an LED light source is a load. The switching converter may be provided with any of the above-described control circuits.

Another embodiment of the present invention relates to an electronic apparatus. The electronic apparatus may include a liquid crystal panel and the above-described lighting apparatus which is a backlight which irradiates the liquid crystal panel from a back side.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present description, a state in which "a member A and a member B are connected" means a state in which the member A and the member B are physically directly connected and also a state in which the member A and the member B are in an electrically connected state or indirectly connected via another member which does not inhibit functions of the member A and the member B.

Similarly, "a state in which a member C is provided between a member A and a member B" means, in addition to the case where the member A and the member C or the member B and the member C are directly connected, the case where those are indirectly connected via another member which does not electrically affect the connection state or inhibit a function of the members.

Figure 3:
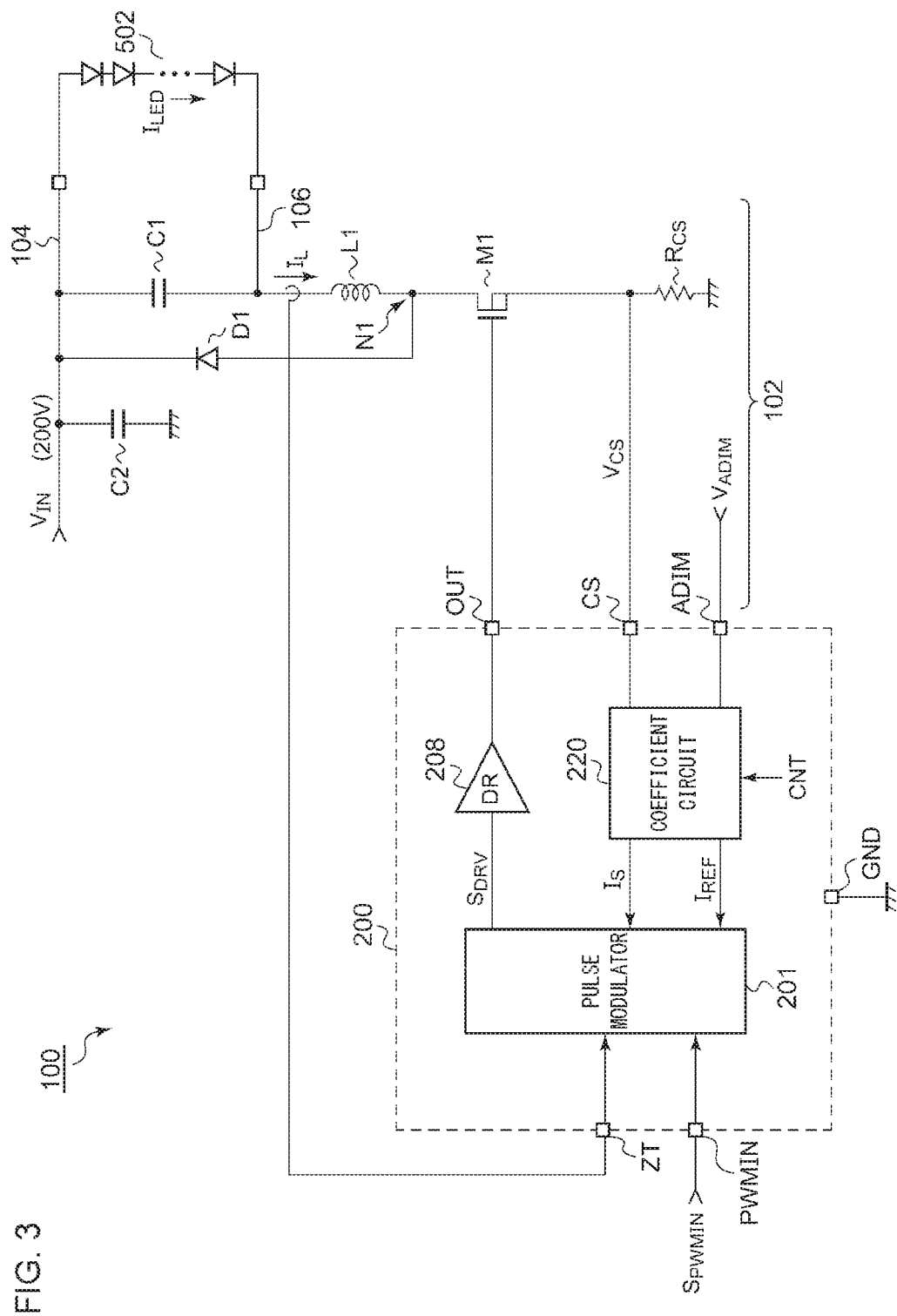
FIG. 3 is a circuit diagram indicating a configuration of a switching converter according to an embodiment.

FIG. 3 is a circuit diagram indicating a configuration of the switching converter 100 according to an embodiment of the present invention. The switching converter 100 is a step-down converter (buck converter) which steps down the input voltage $V_{IN}$ of the input line 104 and outputs the stepped-down output voltage $V_{OUT}$ from the output line 106. One end (anode) of the LED light source 502 is connected to the input line 104, and the other end (cathode) is connected to the output line 106. Between both ends of the LED light source 502, a drive voltage $V_{IN}$-$V_{OUT}$ is supplied.

The LED light source 502 is a device to be driven with a constant current and may be, for example, an LED string including a plurality of light emitting elements (LEDS) connected in series. The switching converter 100 stabilizes the drive current $I_{LED}$ flowing through the LED light source 502 to the target current $I_{REF}$ according to target brightness.

The output circuit 102 includes the smoothing capacitor C1, an input capacitor C2, the rectifier diode D1, the switching transistor M1, the inductor L1, and the detection resistor $R_{CS}$. One end of the smoothing capacitor C1 is connected to the input line 104, and the other end thereof is connected to the output line 106.

One end of the inductor L1 is connected to the output line 106, and the other end is connected to a drain of the switching transistor M1. The detection resistor $R_{CS}$ is disposed on a path of the current (inductor current) $I_L$ flowing through the switching transistor M1 and the inductor L1 during the period when the switching transistor M1 is turned on. A cathode of the rectifier diode D1 is connected to the input line 104, and an anode thereof is connected to the connection point N1 (drain) of the inductor L1 and the switching transistor M1.

A control circuit 200 is a function IC (integrated circuit) integrally integrated on one semiconductor substrate and has an output (OUT) terminal, a current detection (CS) terminal, a zero cross detection (ZT) terminal, a ground (GND) terminal, a pulse dimming input (PWMIN) terminal, and an analog dimming (ADIM) terminal. The GND terminal is grounded. The OUT terminal is connected to a gate of the switching transistor M1, and the detection voltage $V_{CS}$ corresponding to voltage drop across the detection resistor $R_{CS}$ is input to the CS terminal. The switching transistor M1 may be incorporated in the control circuit 200. To the ADIM terminal, the analog dimming voltage $V_{ADIM}$ indicating the target amount $I_{REF}$ of the inductor current $I_L$ and the drive current $I_{LED}$ is input from a host processor 400 (not illustrated).

The control circuit 200 includes a coefficient circuit 220, a pulse modulator 201, and a driver 208. The coefficient circuit 220 multiplies at least either of the detection voltage $V_{CS}$ or the analog dimming voltage $V_{ADIM}$ by a variable coefficient and generates a current detection signal $I_S$ and a current setting signal $I_{REF}$.

The pulse modulator 201 generates the drive pulse $S_{DRV}$ whose duty ratio is adjusted such that the current detection signal $I_S$ approaches the current setting signal $I_{REF}$. The driver 208 drives the switching transistor M1 of the switching converter 100 according to the drive pulse $S_{DRV}$.

A dimming pulse $S_{PWMIN}$ having a duty ratio corresponding to a target light amount of the LED light source 502 is input to the PWMIN terminal. The driver 208 switches the switching transistor M1 while the dimming pulse $S_{PWMIN}$ is at a high level and stops the switching during a low level.

The drive current $I_{LED}$ can be switched in a plurality of current ranges. In the present embodiment, two current ranges are defined, for example, the drive current $I_{LED}$ takes a first range I to 1.5I in a first mode φ1 and a second range 2I to 3I in a second mode φ2. I is a certain unit current amount. That is, a current twice the first mode φ1 flows in the second mode φ2.

Figure 4A:
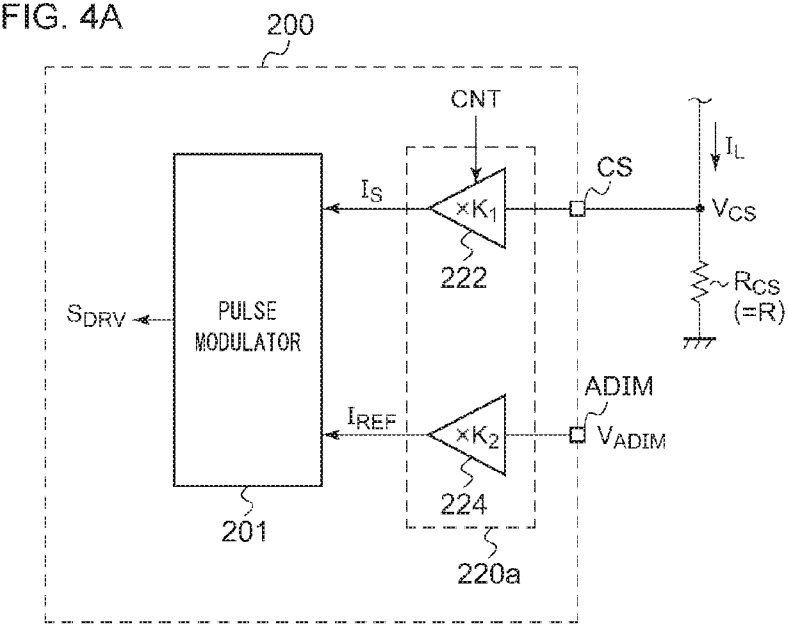
FIG. 4A is a block diagram of a coefficient circuit of FIG. 3.
Figure 4B:
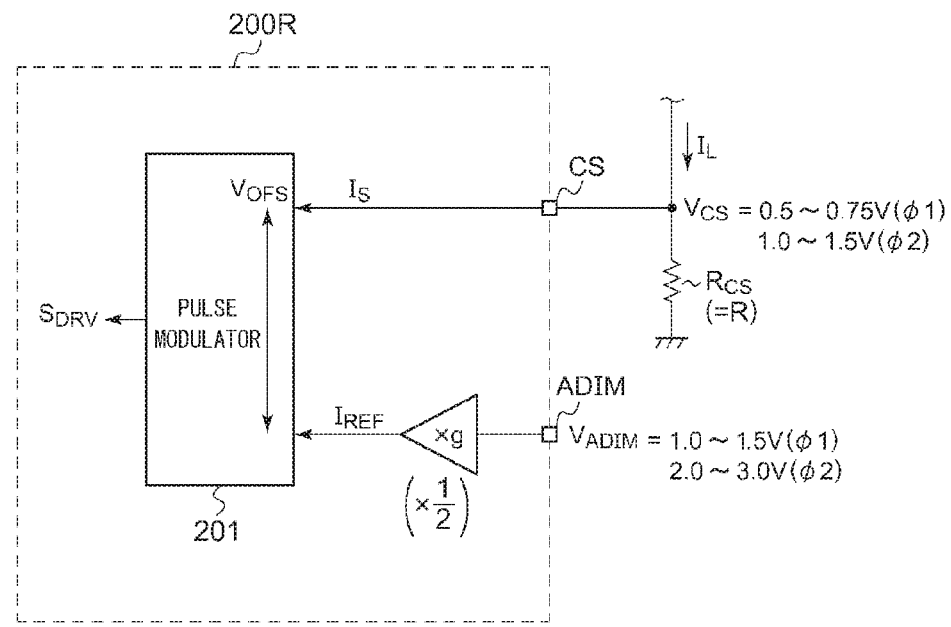
FIG. 4B is a block diagram indicating a comparative technique.

FIG. 4A is a block diagram of the coefficient circuit 220 indicated in FIG. 3, and FIG. 4B is a block diagram indicating a comparative technique.

To simplify the explanation or facilitate understanding here, numerical values of each signal are embodied. In the comparative technique indicated in FIG. 4B, when the resistance value of the detection resistor $R_{CS}$ is R, it is assumed that R×I=0.5V is satisfied. The detection voltage $V_{CS}$ varies from 0.5 to 0.75V in the first mode φ1 and from 1 to 1.5V in the second mode φ2. If g=0.5, the analog dimming voltage $V_{ADIM}$ varies from 1 to 1.5V in the first mode φ1 and from 2 to 3V in the second mode φ2. FIG. 5A is a level diagram of the comparative technique of FIG. 4B.

Assuming that an offset voltage $V_{OFS}$ exists between two inputs of the pulse modulator 201 in FIG. 4B, the influence becomes maximum when the inputs of $V_{CS}$ and $V_{ADIM}$ are at 0.5V which is the minimum voltage.

Refer to FIG. 4A. The coefficient circuit 220 includes a first coefficient circuit 222 and a second coefficient circuit 224. The first coefficient circuit 222 multiplies the detection voltage $V_{CS}$ by a first coefficient $K_1$ selectable from a plurality of values and generates the current detection signal $I_S$. The second coefficient circuit 224 multiplies the analog dimming voltage $V_{ADIM}$ by a predetermined second coefficient $K_2$. The first coefficient circuit 222 switches the value of the first coefficient $K_1$ according to a control signal CNT indicating the current modes φ1 and φ2.

A design example of parameters will be described below.

First Parameter Design Example

The second coefficient $K_2$ is equal to the gain g indicated in FIG. 4B and $K_2$=½. A resistance value of the detection resistor $R_{CS}$ is twice (=2R) a resistance value R of FIG. 4B. The first coefficient $K_1$ is set to a first value (for example, 1) in the first mode φ1 and a second value (for example, 0.5) in the second mode φ2.

Both the variable range of the analog dimming voltage $V_{ADIM}$ in the first mode φ1 and the variable range of the analog dimming voltage $V_{ADIM}$ in the second mode φ2 are 2 to 3V, which overlap each other.

Figure 5B:
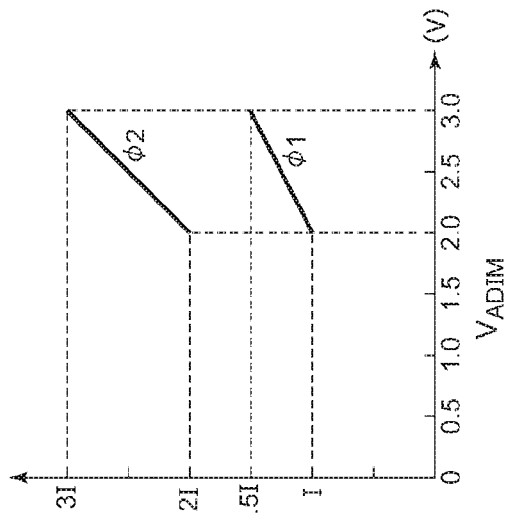
FIG. 5B is a level diagram obtained by combination of a coefficient circuit and a first design example indicated in FIG. 4A.
Figure 5A:
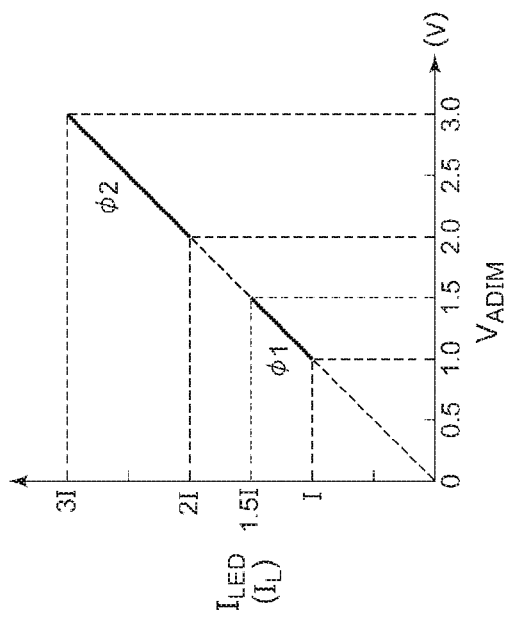
FIG. 5A is a level diagram of the comparative technique of FIG. 4B.

FIG. 5B is a level diagram obtained by combining the coefficient circuit 220 of FIG. 4A with the first design example. In this first design example, in the first mode φ1 and the second mode φ2, the minimum value of two inputs of $I_{REF}$ and $I_S$ of the pulse modulator 201 is 1.0V which is twice the lowest value 0.5V in FIG. 5A. Therefore, the influence of the offset voltage $V_{OFS}$ can be reduced.

Second Parameter Design Example

The second coefficient $K_2$ is equal to the gain g indicated in FIG. 4B and $K_2$=½. A resistance value of the detection resistor $R_{CS}$ is equal to the resistance value R of FIG. 4B. The first coefficient $K_1$ is set to a first value (=2) in the first mode φ1 and to a second value (=1) in the second mode φ2.

In the second design example also, the same level diagram as in FIG. 5B is obtained, and the influence of the offset voltage $V_{OFS}$ can be reduced.

Third Parameter Design Example

In design examples 1 and 2, $K_2$=1 may be used. A variable range of the analog dimming voltage $V_{ADIM}$ in the first mode φ1 and a variable range of the analog dimming voltage $V_{ADIM}$ in the second mode φ2 may be set to 1 to 1.5V by omitting the second coefficient circuit 224. In this case, the second coefficient circuit 224 can be omitted.

The configuration of the switching converter 100 has been described above.

According to the switching converter 100, by switching a coefficient of the coefficient circuit 220 according to a current range of the drive current $I_{LED}$, a range of the current detection signal $I_S$ and the current setting signal $I_{REF}$ is set to a high state in a range where the drive current $I_{LED}$ is small, and the influence of an offset error can be reduced.

Alternatively, since it is possible to reduce the influence of the offset error caused by an offset voltage of a certain level, it means that an input offset voltage $V_{OFS}$ of the pulse modulator 201 may be increased in an application in which a conventional dimming precision degree is sufficient. Amplifiers and comparators with small input offset voltages are difficult to design, a circuit area is large, or adjustment such as trimming is necessary. According to the present embodiment, an allowable level of the offset voltage of the pulse modulator 201 can be alleviated.

The present invention is known as the block diagram and the circuit diagram of FIG. 3 or applicable to various apparatuses and circuits derived from the above description, and the present invention is not limited to specific configurations. Hereinafter, a more specific configuration example will be described to simplify and clarify understanding of the essence of the present invention and the circuit operation, not to narrow the scope of the present invention.

FIGS. 6A to 6D are circuit diagrams indicating a configuration example of the first coefficient circuit 222. The first coefficient circuit 222 in FIGS. 6A to 6C includes a voltage dividing circuit. The first coefficient circuit 222 in FIG. 6A includes resistors R21 and R22, and at least one of them includes a variable resistor.

Figure 6A:
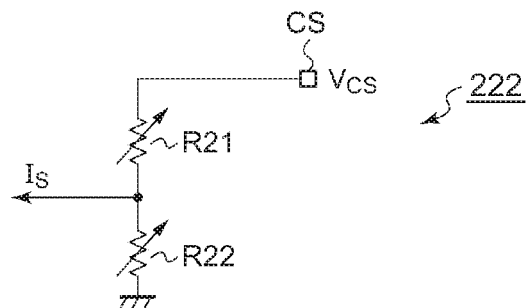
FIGS. 6A to 6D are circuit diagrams indicating a configuration example of a first coefficient circuit.
Figure 6B:
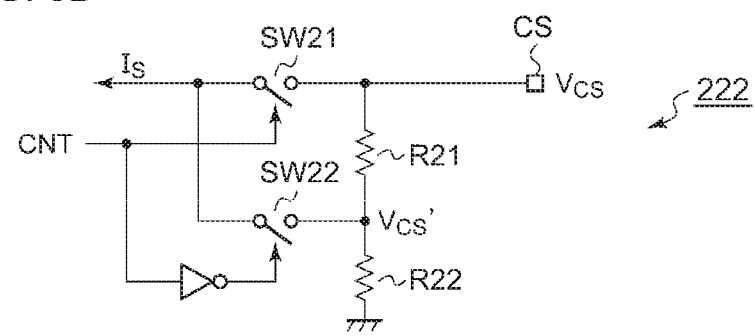

The first coefficient circuit 222 in FIG. 6B includes the fixed resistors R21 and R22. Switches SW21 and SW22 select one of the voltage of a CS terminal and a divided voltage $V_{CS}'$ according to a control signal CNT. The first coefficient circuit 222 in FIG. 6C is a variation of FIG. 6B, and the arrangement of the switches SW21 and SW22 is different.

Figure 6C:
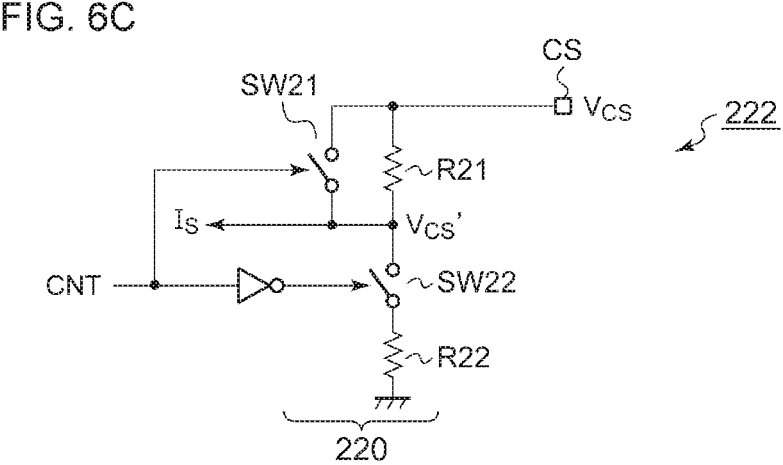

FIGS. 6A to 6C are effective mainly when the first coefficient $K_1$ is switched within a range of 1 or less. In FIGS. 6B and 6C, when the first coefficient $K_1$ can be switched with three or more values, the number of resistors and switches may be increased.

Figure 6D:
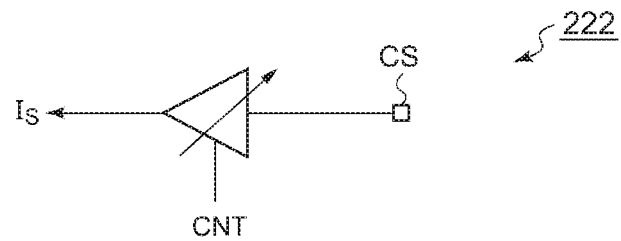

The first coefficient circuit 222 in FIG. 6D includes a variable gain amplifier. In this case, the first coefficient $K_1$ may be larger than 1.

Figure 7:
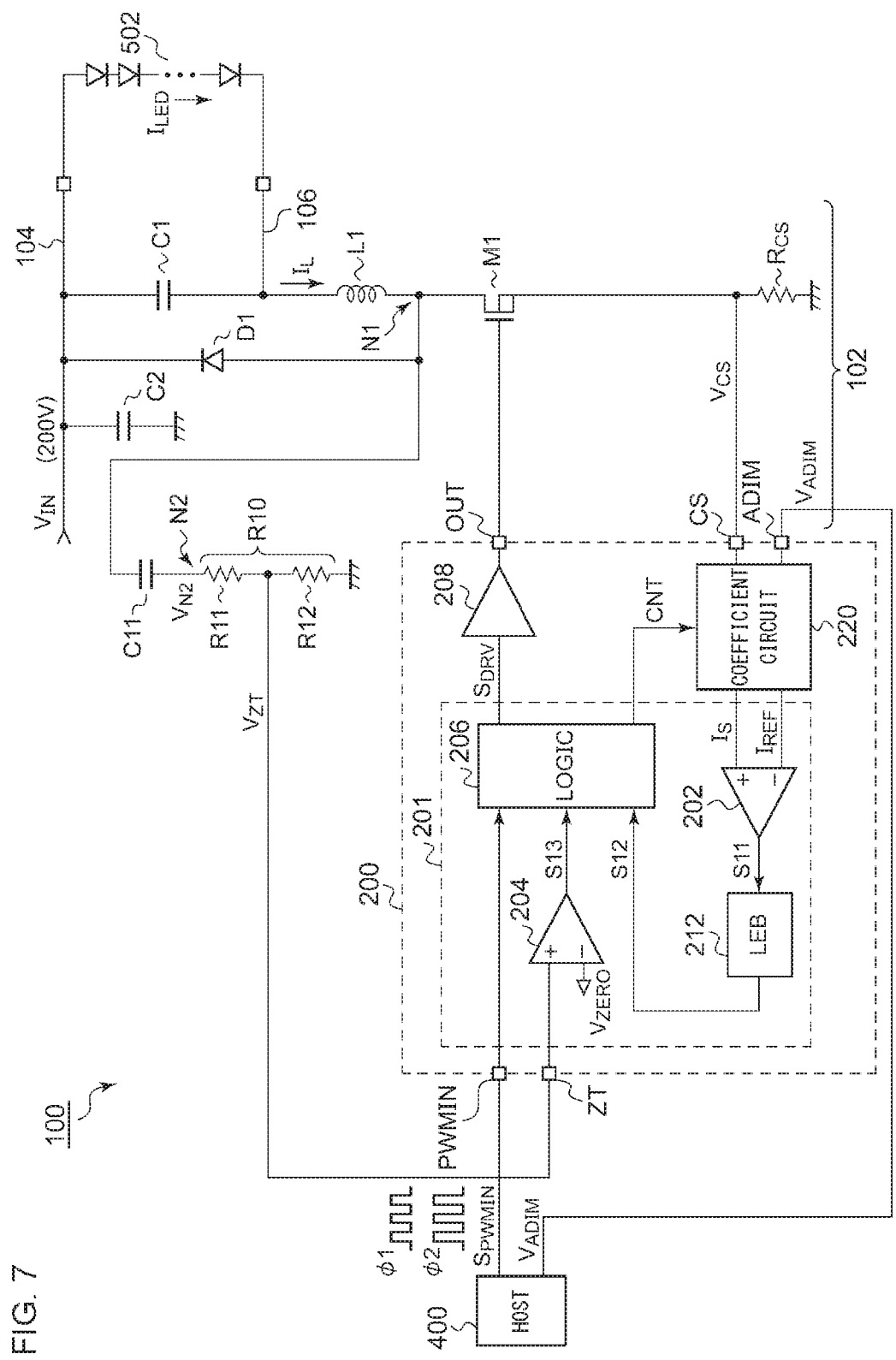
FIG. 7 is a circuit diagram of a switching converter.

Next, a configuration example of the pulse modulator 201 will be described. FIG. 7 is a circuit diagram of the switching converter 100.

The pulse modulator 201 includes a current limit comparator 202, a zero current detection circuit 204, a logic circuit 206, and a leading edge blanking (LEB) circuit 212.

When a current detection signal $I_{CS}$ exceeds the current setting signal $I_{REF}$, in other words, when a coil current $I_L$ reaches a limit current $I_{LIM}$ corresponding to the set value $V_{ADIM}$, the current limit comparator 202 asserts a reset pulse S11 (for example, high level).

The zero current detection circuit 204 generates a set pulse S13 instructing to turn on the switching transistor M1. The switching converter 100 in FIG. 7 is a quasi-resonant (QR) converter and performs soft switching operation of turning on the switching transistor M1 when the coil current $I_L$ becomes zero. When the coil current $I_L$ becomes substantially zero, the zero current detection circuit 204 asserts the set pulse S13 (for example, high level).

A capacitor C11 and a resistor R10 are provided for detecting the coil current $I_L$. When a voltage $V_{N2}$ at a connection point N2 between the capacitor C11 and the resistor R10 crosses a threshold value near zero, the zero current detection circuit 204 asserts the set pulse S13. The voltage $V_{N2}$ at the connection point N2 may be directly input to the ZT terminal, but a voltage $V_{ZT}$ divided by the resistors R11 and R12 may be input.

The zero current detection circuit 204 includes a comparator, and when the voltage $V_{ZT}$ of the ZT terminal crosses the threshold voltage $V_{ZERO}$ set to near zero, the zero current detection circuit 204 asserts the set pulse S13 (for example, high level).

The LEB circuit 212 masks, in other words, invalidates the assertion of the reset pulse S11 during a mask period that is a period from turning on the switching transistor M1 to the lapse of a predetermined time (mask time) and outputs a reset pulse S12 after masking to the logic circuit 206. That is, the masking time of the LEB circuit 212 defines the minimum width of the ON time of the switching transistor M1.

A configuration of the LEB circuit 212 is not particularly limited, and any known technique may be used. For example, the LEB circuit 212 includes a timer circuit and a gate element. The timer circuit generates a mask signal which becomes a predetermined level during the masking time after the switching transistor M1 is turned on. The gate element performs a logical operation on the mask signal and the reset pulse S11 to generate the reset pulse S12 after masking.

The logic circuit 206 receives the set pulse S13 and the reset pulse S12 and generates the drive pulse $S_{DRV}$. (i) When the set pulse S13 is asserted, the drive pulse $S_{DRV}$ transits to an ON level (for example, high level) corresponding to turning-on of the switching transistor M1, and (ii) when the reset pulse S12 is asserted, the drive pulse $S_{DRV}$ transits to an OFF level (for example, low level) corresponding to turning-off of the switching transistor M1.

The dimming pulse $S_{PWMIN}$ whose duty ratio is adjusted according to target brightness of the LED light source 502 is input to the PWMIN terminal. The dimming pulse $S_{PWMIN}$ may be output from the host processor 400 that generates the analog dimming voltage $V_{ADIM}$. The logic circuit 206 may output the drive pulse $S_{DRV}$ while the dimming pulse $S_{PWMIN}$ is a lighting level (high level) and fix the drive pulse $S_{DRV}$ to a low level while the dimming pulse $S_{PWMIN}$ is a turn-off level (low level).

Further, the logic circuit 206 generates the control signal CNT indicating the first mode φ1 and the second mode φ2 and outputs the signal to the coefficient circuit 220.

A control method and a configuration of the pulse modulator 201 are not limited to those indicated in FIG. 7. In addition to the quasi-resonance (QR) method, another known or future available method may be used. Therefore the configuration of the pulse modulator 201 may be suitable for the control method.

As indicated in FIG. 5B, when variable ranges of the analog dimming voltage $V_{ADIM}$ differ in the first mode φ1 and the second mode φ2 with different current ranges, it is difficult to determine the current range (mode) based on the analog dimming voltage $V_{ADIM}$. In this case, the host processor 400 may transmit the control signal indicating the mode to the control circuit 200.

More preferably, the host processor 400 may switch an amplitude level of the dimming pulse $S_{PWMIN}$ according to the current range instead of transmitting the control signal. For example, in the first mode φ1, the dimming pulse $S_{PWMIN}$ may have an amplitude (high level voltage) of 1.5 to 5V, and in the second mode φ2, the dimming pulse $S_{PWMIN}$ may have an amplitude (high level voltage) of 7V or more. As a result, the control circuit 200 can select an appropriate mode based on the amplitude of the dimming pulse $S_{PWMIN}$ and omit the control signal line for instructing the mode.

The embodiments are described as an example. A person skilled in the art understands that the embodiments can be varied by combination of each component and each processing of the embodiments, and such variation is within the scope of the present invention. Hereinafter, such variations will be described.

First Variation

Figure 8:
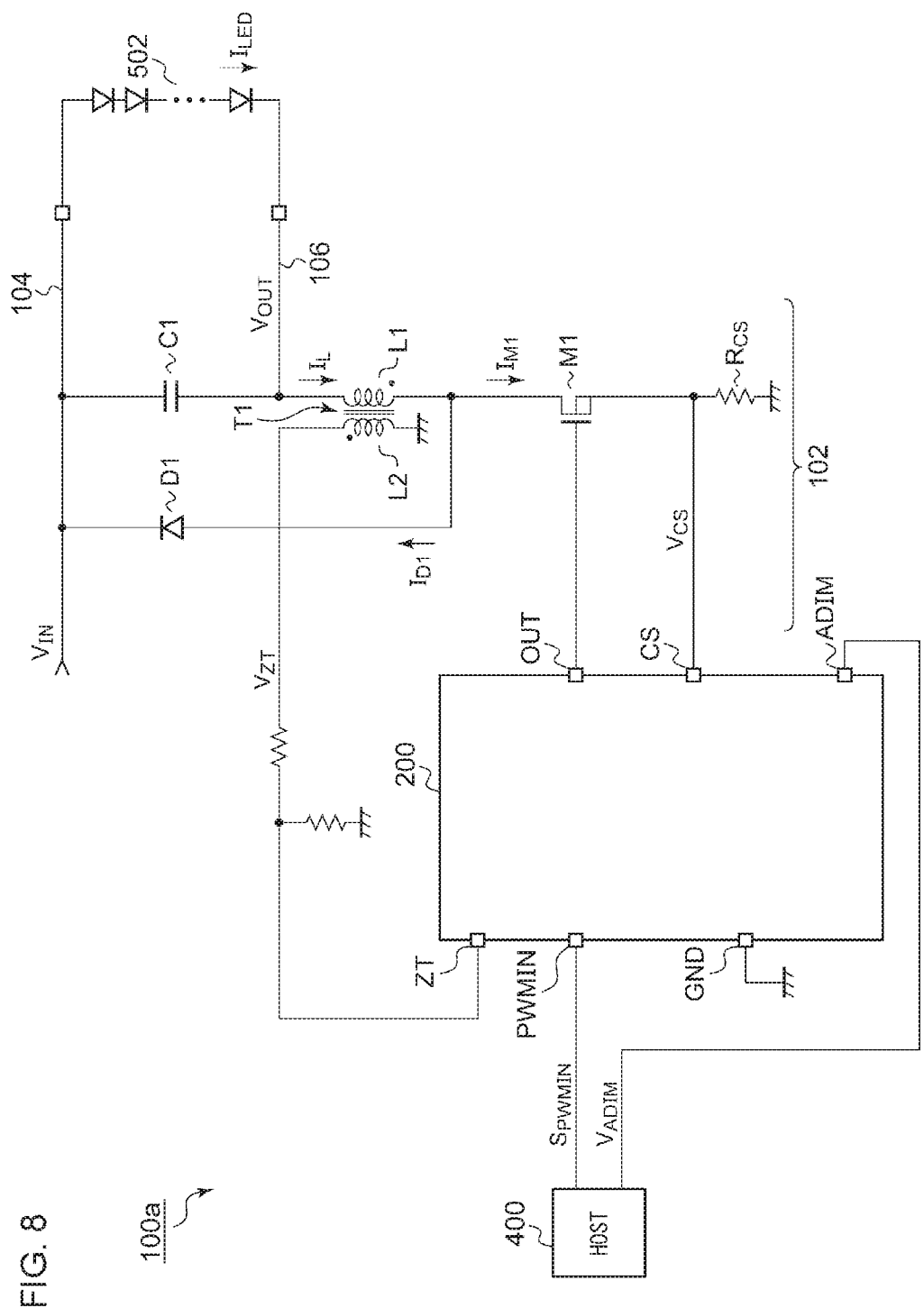
FIG. 8 is a circuit diagram of a switching converter according to a first variation.

FIG. 8 is a circuit diagram of a switching converter 100a according to a first variation. An auxiliary winding L2 is coupled to an inductor L1, and a transformer T1 is formed. A voltage $V_{ZT}$ of the auxiliary winding L2 is input to a ZT terminal of a control circuit 200. A configuration of the control circuit 200 is similar to the configuration in FIG. 7.

Second Variation

Figure 1:
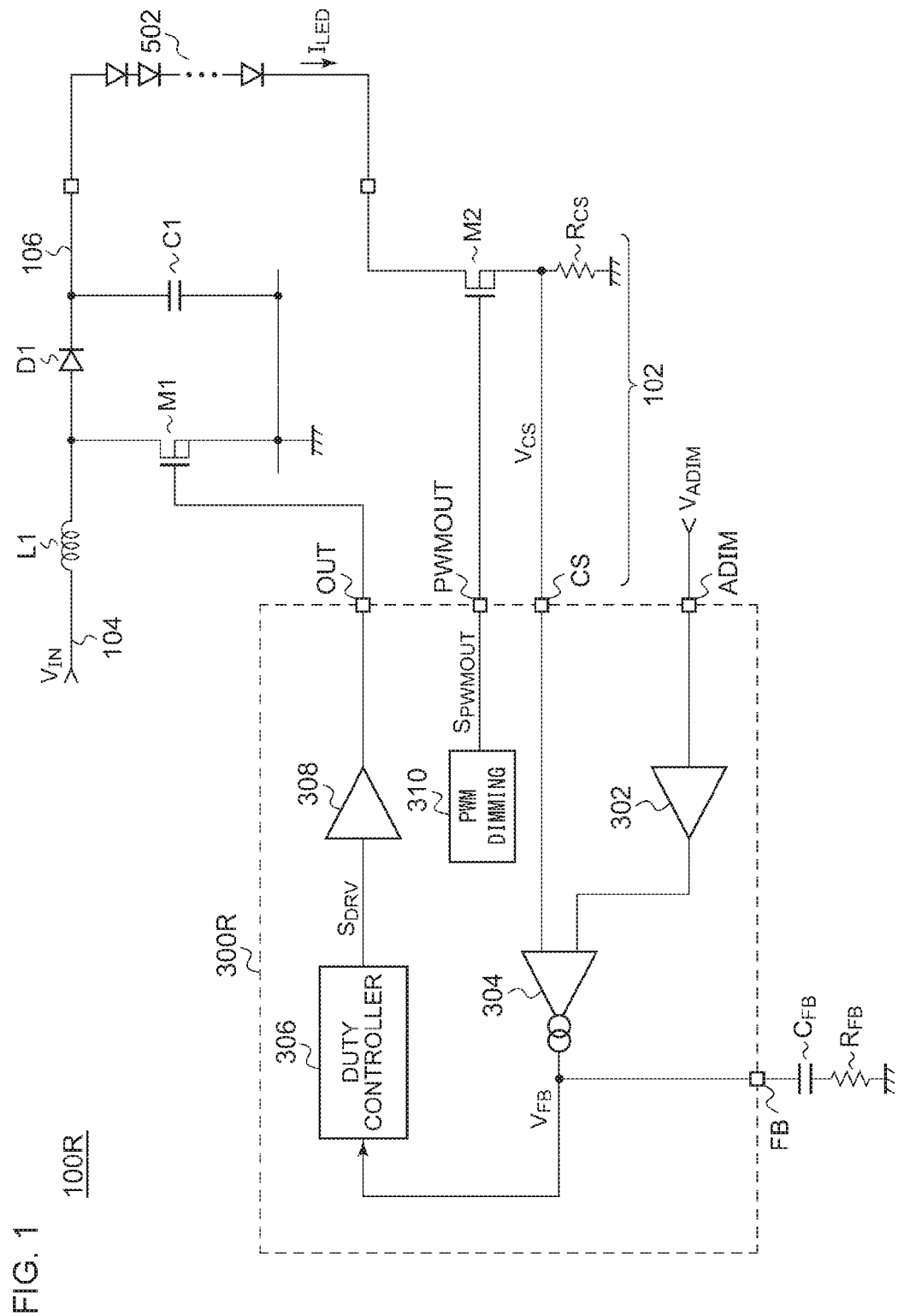
FIG. 1 is a circuit diagram of a step-up switching converter.
Figure 2:
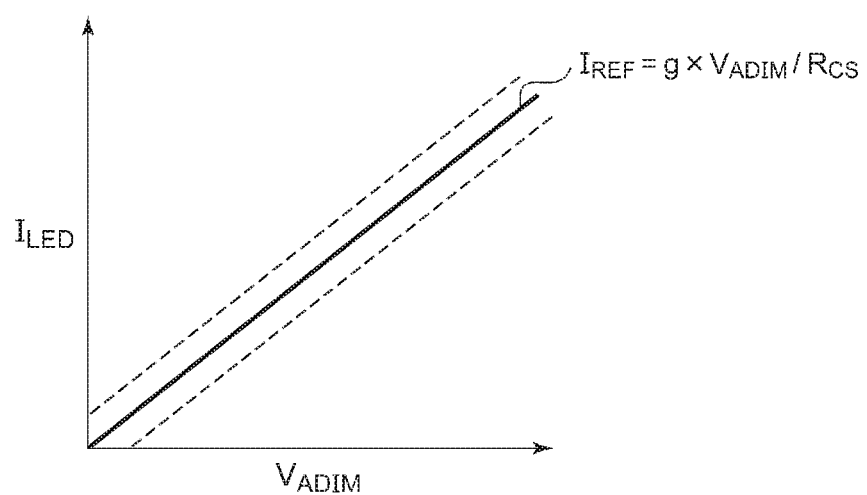
FIG. 2 is a diagram indicating a relationship between an analog dimming voltage $V_{ADIM}$ and a drive current $I_{LED}$.
Figure 9:
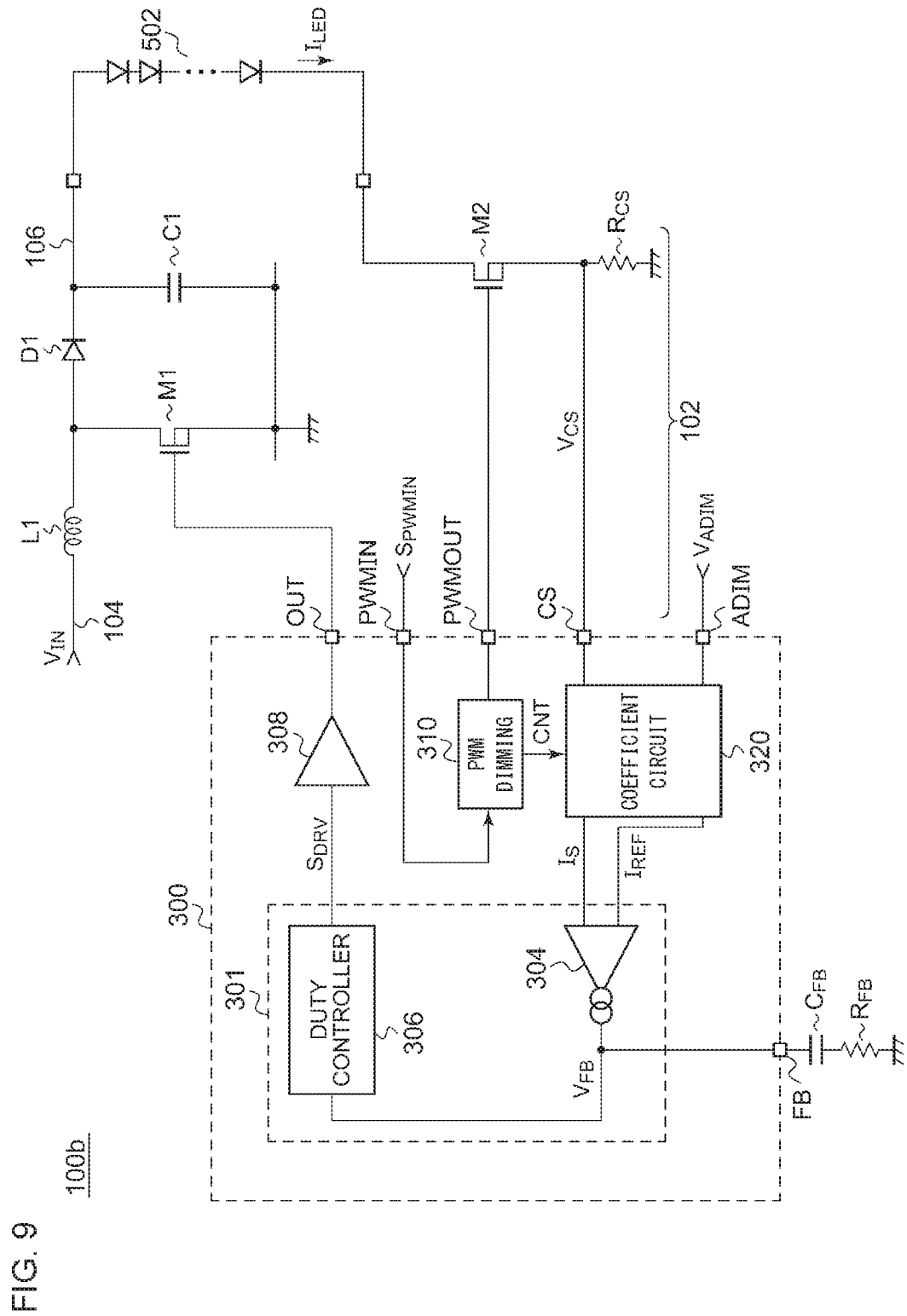
FIG. 9 is a circuit diagram of a switching converter according to a second variation.

FIG. 9 is a circuit diagram of a switching converter 100b according to a second variation. The switching converter 100 is a step-up type as in FIG. 1. A control circuit 300 includes a pulse modulator 301, a driver 308, a PWM dimming controller 310, and a coefficient circuit 320.

The coefficient circuit 320 multiplies at least one of a detection voltage $V_{CS}$ and an analog dimming voltage $V_{ADIM}$ by a variable coefficient and generates a current detection signal $I_S$ and a current setting signal $I_{REF}$. The coefficient circuit 320 is equivalent to the coefficient circuit 220 in FIG. 3.

The pulse modulator 301 includes an error amplifier 304 and a duty controller 306. The error amplifier 304 amplifies an error between the current detection signal $I_S$ and the current setting signal $I_{REF}$. The duty controller 306 generates a drive pulse $S_{DRV}$ having a duty ratio corresponding to an output $V_{FB}$ of the error amplifier 304. A control method and configuration of the pulse modulator 301 is also not particularly limited, and other known methods such as voltage mode, peak current mode, average current mode, and hysteresis (Bang-Bang) control can be used.

The PWM dimming controller 310 switches the dimming transistor M2 in accordance with an external dimming pulse $S_{PWMIN}$ from the outside. In the case where the first mode φ1 and the second mode φ2 are switched according to the amplitude of the dimming pulse $S_{PWMIN}$ as described above, the PWM dimming controller 310 has an amplitude detecting function of the dimming pulse $S_{PWMIN}$ and switches a coefficient of the coefficient circuit 320 in accordance with a detection result.

A step-up switching converter 100b can also obtain the same effect as the step-down switching converter.

Third Variation

Figure 10:
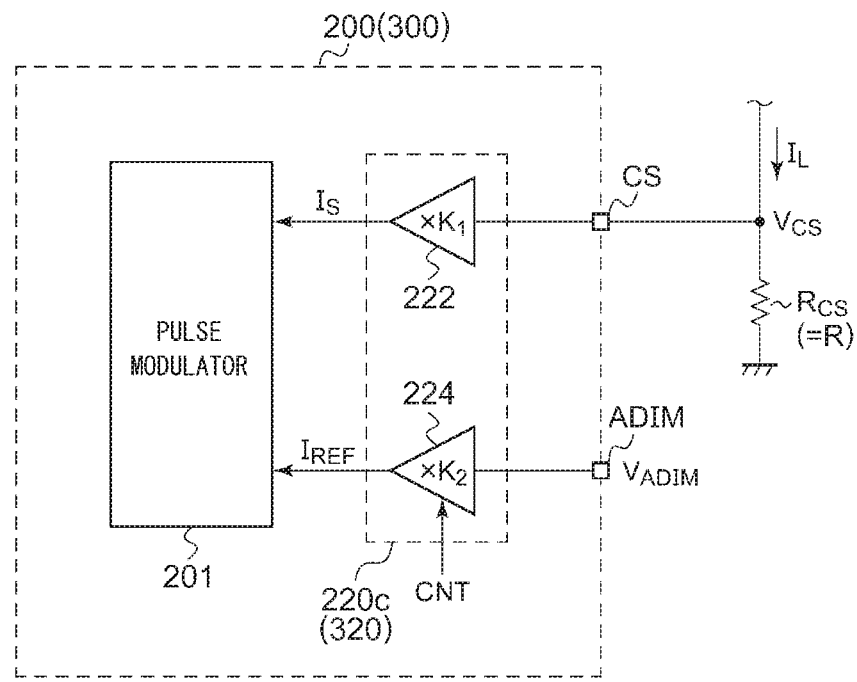
FIG. 10 is a block diagram of a coefficient circuit according to a third variation.

In the embodiment, in a coefficient circuit 220 (320), a first coefficient $K_1$ is made variable, and a second coefficient $K_2$ is fixed, but the present invention is not limited thereto. FIG. 10 is a block diagram of a coefficient circuit 220c according to a third variation. In this variation, the first coefficient $K_1$ is fixed, and the second coefficient $K_2$ is variable. The second coefficient $K_2$ is selected from a plurality of values according to a control signal CNT. A second coefficient circuit 224 can be configured similarly to the first coefficient circuit 222 in FIGS. 6A to 6D.

Fourth Parameter Design Example

The first coefficient $K_1$ is set to 1, and a resistance value of a detection resistor $R_{CS}$ is set to twice (=2R) the resistance value R in FIG. 4B. The second coefficient $K_2$ is set to a first value (for example, 1) in a first mode φ1 and a second value (for example, 2) in a second mode φ2.

Fourth Variation

In a coefficient circuit 220 (320), both of a first coefficient $K_1$ and a second coefficient $K_2$ may be made variable. For example, in the first parameter design example, if the second coefficient $K_2$ is switched between two values of ½ and 1, as indicated in FIG. 5A, a drive current proportional to an analog dimming voltage $V_{ADIM}$ can be generated without overlapping a variable range of the analog dimming voltage $V_{ADIM}$ in a first mode φ1 and a variable range of the analog dimming voltage $V_{ADIM}$ in a second mode φ2.

Fifth Variation

In the embodiment, the case where a current range of the second mode φ2 is twice a current range of the first mode φ1 has been described, but the present invention is not limited thereto. It can be generalized that the current range of the second mode φ2 is β times the current range of the first mode φ1. In this case, when a first coefficient $K_1$ is variable, a second value used in the second mode φ2 may be 1/β times a first value used in the first mode φ1. When the second coefficient $K_2$ is variable, the second value used in the second mode φ2 may be β times the first value used in the first mode φ1.

Sixth Variation

In the embodiment, the case where the LED light source 502 is an LED string has been described, but a type of the load is not particularly limited, and the present invention is applicable not only to a light source but also to various other loads to be driven with constant current.

Seventh Variation

In the embodiment, design examples of a plurality of parameters have been indicated. However, a person skilled in the art understands that the range of the analog dimming voltage $V_{ADIM}$, the coefficient, and the detection resistor $R_{CS}$ can be combined in addition to the exemplifications, and the scope of the present invention is not limited in terms of a combination of parameters.

Eighth Variation

In the embodiment, setting of logic values of high level and low level of the logic circuit is for an example, and the setting can be freely changed by appropriately inverting by such as an inverter.

Application

Figure 11:
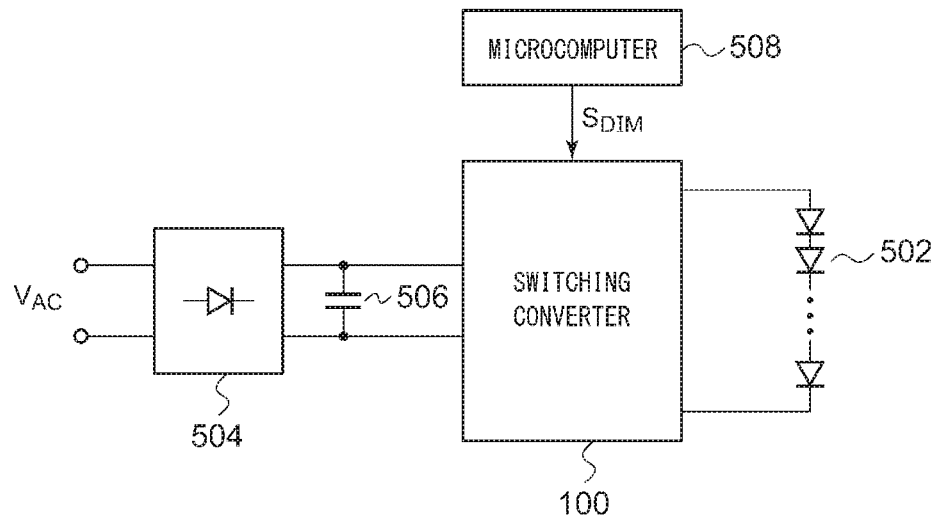
FIG. 11 is a block diagram of a lighting apparatus using a switching converter.

Lastly, applications of the switching converter 100 will be described. FIG. 11 is a block diagram of a lighting apparatus 500 using the switching converter 100. The lighting apparatus 500 includes a rectifier circuit 504, a smoothing capacitor 506, and a microcomputer 508, in addition to an LED light source 502 which is a light-emitting unit and the switching converter 100. The rectifier circuit 504 and the smoothing capacitor 506 rectify and smooth a commercial AC voltage $V_{AC}$ and convert it into a DC voltage $V_{DC}$. The microcomputer 508 generates a control signal Sum for instructing brightness of the LED light source 502. The switching converter 100 receives the DC voltage $V_{DC}$ as an input voltage $V_{IN}$ and supplies a drive current $I_{LED}$ corresponding to the control signal $S_{DIM}$ to the LED light source 502. The control signal Sum includes the above-described analog dimming voltage $V_{ADIM}$ and dimming pulse $S_{PWMIN}$.

Figure 12A:
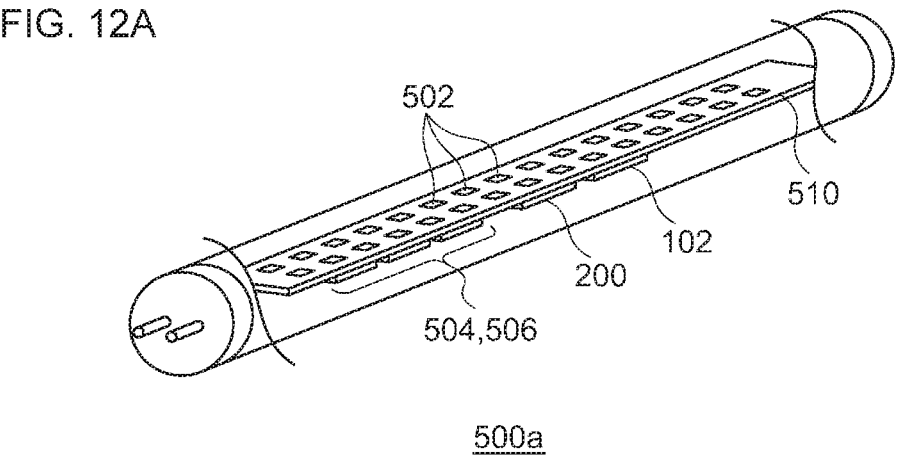
FIGS. 12A to 12C are diagrams indicating specific examples of a lighting apparatus.
Figure 12B:
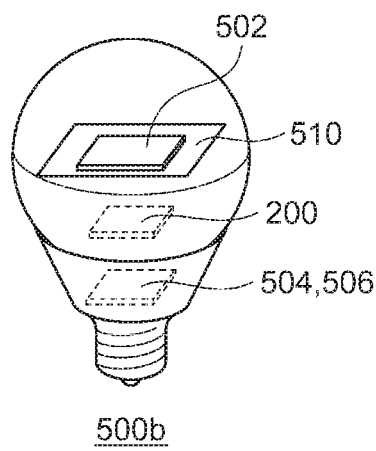
Figure 12C:
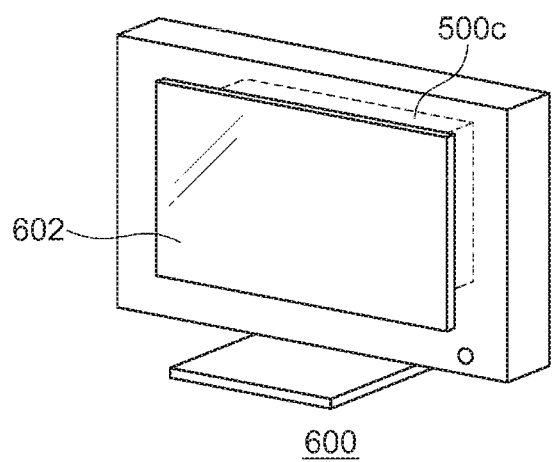

FIGS. 12A to 12C are diagrams indicating specific examples of the lighting apparatus 500. Not all components are indicated in FIGS. 12A to 12C, and a part of the components is omitted. A lighting apparatus 500a in FIG. 12A is a straight tube LED lighting. A plurality of LED elements included in the LED string which is the LED light source 502 is laid out on the substrate 510. On the substrate 510, such as the rectifier circuit 504, a control circuit 200, and an output circuit 102 are mounted.

A lighting apparatus 500b in FIG. 12B is a bulb-type LED lighting. An LED module as the LED light source 502 is mounted on the substrate 510. The control circuit 200 and the rectifier circuit 504 are mounted inside a housing of the lighting apparatus 500b.

A lighting apparatus 500c in FIG. 12C is a backlight incorporated in a liquid crystal display apparatus 600. The lighting apparatus 500c irradiates the back surface of a liquid crystal panel 602.

Particularly, in recent years, in addition to 2D images, there is the liquid crystal display apparatus 600 capable of displaying 3D images. In the 3D mode, since an image for the left eye and an image for the right eye are displayed alternately, if the brightness of the backlight is set to the same level as 2D mode, the image becomes dark. Therefore, in the 3D mode, the brightness of the backlight is increased. The switching converter 100 according to the embodiment is preferable to such the liquid crystal display apparatus 600 capable of switching between the 2D/3D modes, the 2D mode is operated in a first mode φ1, and the 3D mode is operated in a second mode φ2.

Alternatively, the lighting apparatus 500 can also be used as a ceiling light. In this way, the lighting apparatus 500 of FIG. 11 can be used in various applications.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a switching converter which supplies a drive current to a light source, the control circuit, comprising:
   a current detection terminal to a detection resistor provided on a path of the drive current or an inductor current, and to receive a detection voltage which is proportional to a voltage drop across the detection resistor;
   an analog dimming terminal to be coupled to receive an analog dimming voltage indicating a target amount of the drive current;
   a coefficient circuit structured to multiply at least one of the detection voltage and the analog dimming voltage by a variable coefficient and to generate a current detection signal and a current setting signal;
   a pulse modulator coupled to receive the current detection signal and the current setting signal, and structured to generate a drive pulse whose duty ratio is adjusted such that the current detection signal approaches the current setting signal; and
   a driver structured to drive a switching element of the switching converter according to the drive pulse, wherein the variable coefficient is selectable from a plurality of values based on a range of the drive current.

2. The control circuit according to claim 1, wherein the coefficient circuit comprises a first coefficient circuit structured to multiply the detection voltage by a first coefficient selectable from a plurality of values and to generate the current detection signal.

3. The control circuit according to claim 2, wherein the first coefficient is structured to be switchable at least between a first value used in a first current range of the drive current and a second value used in a second current range of the drive current, and
   a variable range of the analog dimming voltage in the first current range overlaps with a variable range of the analog dimming voltage in the second current range.

4. The control circuit according to claim 2, wherein the first coefficient circuit includes a voltage dividing circuit having a variable dividing ratio.

5. The control circuit according to claim 2, wherein the first coefficient circuit includes a variable gain amplifier having a variable gain.

6. The control circuit according to claim 2, wherein the coefficient circuit further comprises a second coefficient circuit structured to multiply the analog dimming voltage by a second coefficient and to generate the current setting signal.

7. The control circuit according to claim 1, wherein the coefficient circuit comprises a second coefficient circuit structured to multiply the analog dimming voltage by a second coefficient selectable from a plurality of values and to generate the current setting signal.

8. The control circuit according to claim 7, wherein the second coefficient is structured to be switchable at least between a first value used in a first current range of the drive current and a second value used in a second current range of the drive current, and
   a variable range of the analog dimming voltage in the first current range overlaps with a variable range of the analog dimming voltage in the second current range.

9. The control circuit according to claim 7, wherein the second coefficient circuit comprises a voltage dividing circuit having a variable voltage dividing ratio.

10. The control circuit according to claim 7, wherein the second coefficient circuit comprises a variable gain amplifier having a variable gain.

11. The control circuit according to claim 1, wherein the switching converter is a step-down type and comprises:
    an output capacitor provided between an input line and an output line,
    an inductor, a switching transistor, and the detection resistor provided in series between the output line and a ground line, and
    a diode having a cathode coupled to the input line, and an anode coupled to a connection point between the inductor and the switching transistor.

12. The control circuit according to claim 11, wherein the pulse modulator comprises:
    a current limit comparator structured to compare the current detection signal with the current setting signal and to assert a reset pulse when the current detection signal exceeds the current setting signal;
    a zero current detection circuit structured to assert a set pulse when a current flowing into the inductor is substantially zero; and
    a logic circuit structured to receive the set pulse and the reset pulse and to generate the drive pulse, wherein (i) the drive pulse transits to an ON level corresponding to turning-on of the switching transistor in response to an assertion of the set pulse, and (ii) the drive pulse transits to an OFF level corresponding to turning-off of the switching transistor in response to an assertion of the reset pulse.

13. The control circuit according to claim 12, wherein the pulse modulator further comprises a leading edge blanking circuit structured to mask the assertion of the reset pulse during a mask period that is a period from the turning-on of the switching transistor to the lapse of a predetermined time and to output the reset pulse after masking to the logic circuit.

14. The control circuit according to claim 12, wherein the switching converter further comprises a first capacitor and a first resistor provided in series between a connection point of the inductor and the switching transistor and a ground line, and wherein the zero current detection circuit is structured to assert the set pulse when a potential of the first resistor and a predetermined threshold voltage cross.

15. The control circuit according to claim 12, wherein the switching converter further comprises an auxiliary winding coupled to the inductor, wherein the zero current detection circuit is structured to assert the set pulse when a voltage of the auxiliary winding and a predetermined threshold voltage cross.

16. The control circuit according to claim 1, wherein the switching converter is a step-up type and comprises:
    an inductor and a switching transistor provided in series between an input line and a ground line;
    a rectifying element having one end coupled to an output line, and the other end coupled to a connection point of the inductor and the switching transistor; and
    an output capacitor coupled to the output line.

17. The control circuit according to claim 16,
    wherein the pulse modulator comprises:
    an error amplifier structured to amplify an error between the current detection signal and the current setting signal; and
    a duty controller structured to generate the drive pulse having a duty ratio corresponding to an output of the error amplifier.

18. The control circuit according to claim 1, further comprising:
   a pulse dimming terminal structured to receive a dimming pulse for pulse modulation dimming from a host processor structured to generate the analog dimming voltage,
   wherein the coefficient circuit is controlled based on the amplitude of the dimming pulse.

19. The control circuit according to claim 1, which is monolithically integrated on a single semiconductor substrate.

20. A switching converter, comprising the control circuit according to claim 1.

21. A lighting apparatus, comprising:
   an LED light source including a plurality of LEDs (light emitting diodes) connected in series;
   a rectifier circuit structured to smooth and rectify a commercial AC voltage; and
   a switching converter structured to receive a DC voltage smoothed and rectified by the rectifier circuit as an input voltage and in which the LED light source is a load, wherein the switching converter comprises the control circuit according to claim 1.

22. An electronic apparatus, comprising:
   a liquid crystal panel; and
   the lighting apparatus according to claim 21, which is a back light which irradiates the liquid crystal panel from a back side.

* * * * *